US006834687B2

(12) United States Patent
Abzaletdinov (10) Patent No.: US 6,834,687 B2
(45) Date of Patent: Dec. 28, 2004

(54) FLUIDS DISPOSAL SYMBIOTIC APPARATUS (76) Inventor: Rustam Abzaletdinov, 7816 Creekway Ct., Plano, TX (US) 75024

( * ) Notice: Subject to any disclaimer, the term of this patent is extended or adjusted under 35 U.S.C. 154(b) by 0 days.

(21) Appl. No.: 10/249,916

(22) Filed: May 17, 2003

(65) Prior Publication Data

US 2004/0226626 A1 Nov. 18, 2004

(51) Int. Cl.⁷ .............................. B65B 1/04; B65B 3/04; B67C 3/02
(52) U.S. Cl. ......................... 141/86; 141/98; 141/237; 141/238; 141/241; 141/363; 141/364; 141/366; 184/106
(58) Field of Search ............................ 141/86, 98, 234, 141/237–241, 331–345, 363–366; 184/106

(56) References Cited

U.S. PATENT DOCUMENTS 2,872,953 A * 2/1959 Duncan ...................... 141/237
5,381,839 A * 1/1995 Dowd ......................... 141/242
5,560,404 A * 10/1996 Blair et al. .................... 141/98
6,085,806 A * 7/2000 Davis et al. ................... 141/98

* cited by examiner

Primary Examiner—Timothy L. Maust (57) ABSTRACT

Fluids disposal symbiotic apparatus represents system and method helping technician, lube professional, hobbyist, as well as automotive, aircraft or marine vehicle subject matter specialist quickly yet conveniently change and dispose oil, transmission and/or other fluids, including fresh and wasted, avoiding oil exchange mess by utilizing a symbiotic multi-functional fluid disposal apparatus for collecting, storing and dispensing diversity of waste fluids. Said apparatus equipped with plurality of intake funnel, control valves, and output hoses or nozzles, to symbiotically input and accommodate coolant, engine oil, transmission fluid or other drainage liquid configurations, and adapt to original set of emptied bottles or plastic containers as an output configuration hosted in an original box, thus ensuring an operator may safely, cleanly and conveniently drain, collect and accurately dispose waste fluids.

5 Claims, 6 Drawing Sheets

Prior Art

FLUIDS DISPOSAL SYMBIOTIC APPARATUS

BACKGROUND OF INVENTION

Oil change may or may not be significant or pleasant event to a majority of vehicle owners depending on their passion towards vehicles, as well as understanding or knowledge of the car engine, transmission and drive train tear, wear and lifetime considerations. Many vehicle owners may have or have no idea what is going on under the hood of their vehicles as most of us just drive until said vehicle runs, or till one of the warning indicators goes off on its dashboard.

Yet another category of drivers do know it is necessary to change oil from time to time at regular intervals so they more or less periodically turn their vehicle into the hands of lube shops or dealership service departments, having a little idea about specifics of engine oil, coolant, or transmission fluid or other liquids, vital to run machinery, exchange process.

Next category of vehicle owners may be characterized as having a love affair with their vehicles, they do know every detail of the oil and other fluids specifics and change cycles along with the extensive knowledge of said fluid types to perform oil change right to, for example, please an engine with synthetic brand. This particular category of vehicle owners religiously follows oil change methodology to every detail. Needless to say that said category of vehicle owners do prefer to perform the oil change themselves or closely watch the exchange process from beginning to end not to overlook any specifics, e.g. presence of the thin layer of fresh oil on the new oil filter gasket, or presence of the copper or aluminum washer on the neck of the drain plug or bolt, ensuring said bolt has not been over tight to protect the pan thread from damage.

The latter category of caring owners is not the largest but may count several million people just in the United States, may be counting dozens to hundreds million people around the globe. These folks are often referred to as "do it yourself" in the Prior Art and we may also take courage to call latter category an "automotive fanatics" or "involved car hobbyists".

SUMMARY OF INVENTION

A system and method allowing hobbyist, technician, lube professional, automotive, aircraft or marine vehicle subject matter specialist quickly yet conveniently change and dispose oil, transmission and/or other fluids, avoiding oil exchange mess by utilizing a symbiotic multifunctional fluid disposal apparatus for collecting, storing and dispensing diversity of waste fluids. Said apparatus equipped with plurality of intake funnel, control valves, and output hoses or nozzles, to symbiotically input and accommodate coolant, engine oil, transmission fluid or other drainage liquid configurations, and adapt to original set of emptied bottles or plastic containers as an output configuration hosted in an original box, thus ensuring an operator may safely, cleanly and conveniently drain, collect and accurately dispose waste fluids used in plurality machinery types.

DETAILED DESCRIPTION

Figure 1:
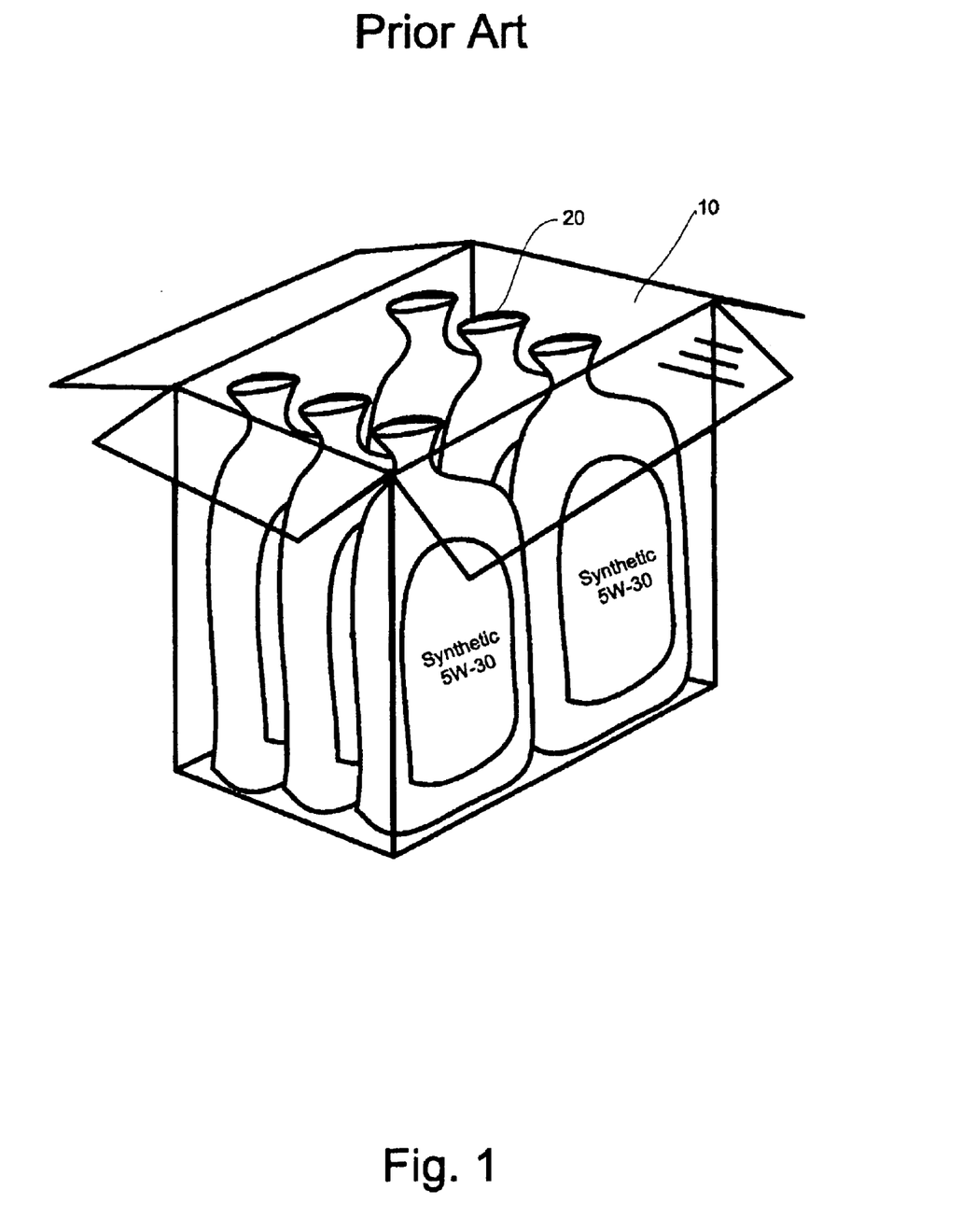
FIG. 1 presents and article of Prior Art recognized as box with plurality of oil cans in it, said package usually sold an auto-stores, convenient stores, gas stations or multiplicity of shopping marts or shopping centers.

FIG. 1 therein renders an instance of Prior Art most commonly presented by often cardboard box 10 containing a plurality of plastic bottles 20, usually six quarter capacity plastic containers, filled with fresh engine oil or other vehicle related fluid as offered to do it yourself hobbyists or any other consumers via retail marts or supply stores such as Wall-Mart, K-Mart, Target, Pep Boys, Napa and others.

Figure 2:
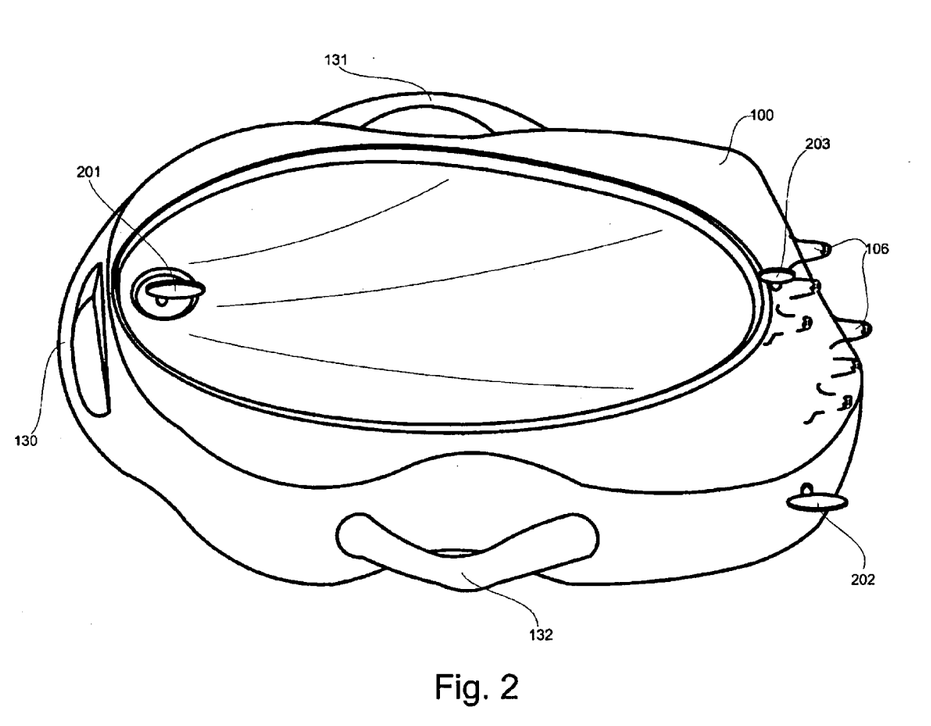
FIG. 2 shows top-side view of fluids disposal symbiotic apparatus.

FIG. 2 presents said fluids disposal symbiotic apparatus 100. The apparatus 100 is made of oil resistant material e.g. polymer plastic, is flat enough to easily fit under most vehicles. It has a plurality of nozzles 106; helper handles 130, 131, 132, and at least three control valves 201, 202, 203.

Figure 3:
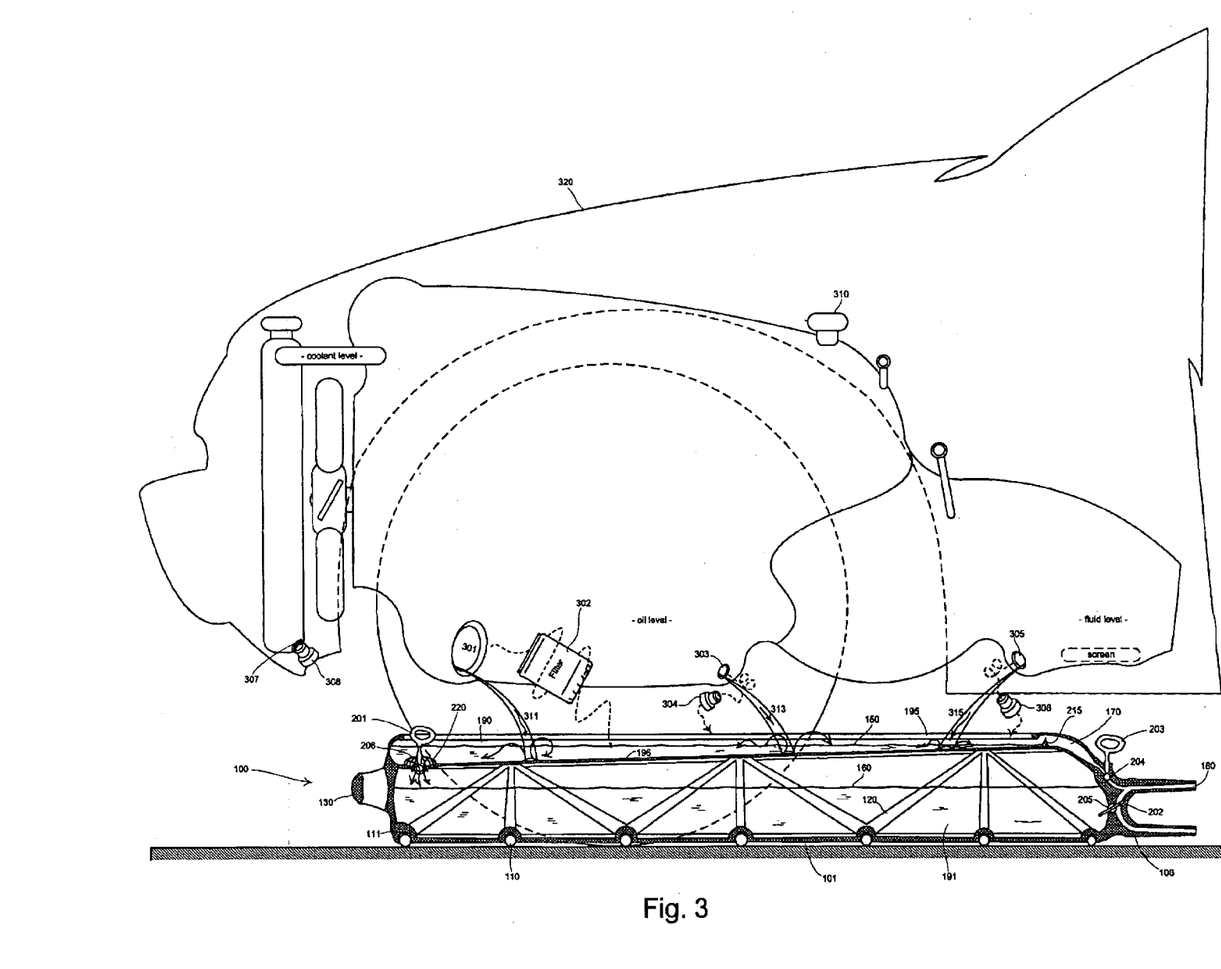
FIG. 3 reveals detailed side view of fluids disposal symbiotic apparatus placed underneath vehicle in the process of collecting waste fluids.

FIG. 3 renders fluids disposal symbiotic apparatus 100 equipped with plurality of possibly spheroid or other supportive type wheels 110 embedded in cavities 111 formed within the apparatus 100 bottom 101, such that hobbyist in most cases may have sufficient access space to the undercarriage of the vehicle to reach to the oil filter 302 neck, drain plug 304 and other bolt 306 and/or plug 308 responsible for opening drain points to release flows of waste transmission fluid, engine coolant, etc.

The symbiotic apparatus 100 is characterized by an extremely wide open, large waste fluid intake area 195 forming top funnel like input panel 190 of the apparatus 100. Said funnel 190 is capable of simultaneously collecting waste fluids 311, 313, 315 from plurality of dispersed waste release points, for example from the oil filter seat opening 301, engine oil drain opening 303, transmission fluid release point 305, and radiator drain 308. Most practically just a single type of waste fluid would be drained at a time, for example waste engine oil from two release points including oil filter opening 301 and oil drain plug seat 303.

The oil collecting funnel 190 is large enough to stretch under most car engine compartments. Said funnel 190 has almost rectangular bay like recess shape 196 surrounded by perimeter wall 195 allowing catch and hold not only streams of waste fluids 311, 313, 315, but oil filter 302 and drain plugs or bolts 304, 306, 308 with washers if they occasionally slip from the palm of technician while being unscrewed or removed from their seats 301, 303, 305, 307.

Once all participating in fluid exchange process oil or fluid release openings 301, 303, 305 are freed from plug covers, bolts, washers and oil filter 308, 302, 304, 306 possibly dropped into the funnel 190, oil or fluid 311, 313, 315 may be collected into the funnel 190. The waste liquids flow freely through the first cage-like filter guard 206, which, by design has plurality of go-through slots 220 sized about one third to a half of diameter of the neck of an average drain plug or bolt 304. Guard stops anything but waste liquids from passing through guard 206. For example such items as oil filter 302, bolts, nuts or drain plugs 308, 304, 306 remain within the inside perimeter of the funnel 190 but kept at the edge of the outer perimeter of the guard 206.

The method of operation of the symbiotic apparatus 100 is simple. Technician opens the first valve 201, closes second valve 202, closes third valve 203, and slides apparatus 100 under the car. Apparatus has plurality of wheels 110 on the bottom 101 to help glide apparatus 100 underneath the vehicle's motor and transmission compartment. Apparatus 100 may be positioned under at least an oil filter and oil pan drain area, additionally, if desired under the transmission drain 305 too. Technician removes oil filter 302 and oil drain plug 304, and may choose to leave them in the funnel 190 at her or his convenience.

Waste fluids 311, 313, 315 freely go downstream recess bay 196, reaching lower inner corner of the funnel, then flow through said guard 206 and first valve 201 finally draining down into the apparatus 100 container stomach 191. Oil filter 302, drain plug 304 or other debris are stopped by the guard 206 screen 220.

Once waste fluids collection is complete in the container stomach 191, the oil plug 304 and oil filter 302 may be replaced with cleansed, wiped and new instances, next, fresh oil is poured into the engine through top intake 310, then the first valve 201 may be closed and apparatus 100 finally may be removed preferably by the handle 130 from under the vehicle. Plurality of wheels 110 eases apparatus 100 removal operation.

Technician ensures the first valve 201 is closed, and so do second and third valves 202 and 203 respectfully.

Figure 4:
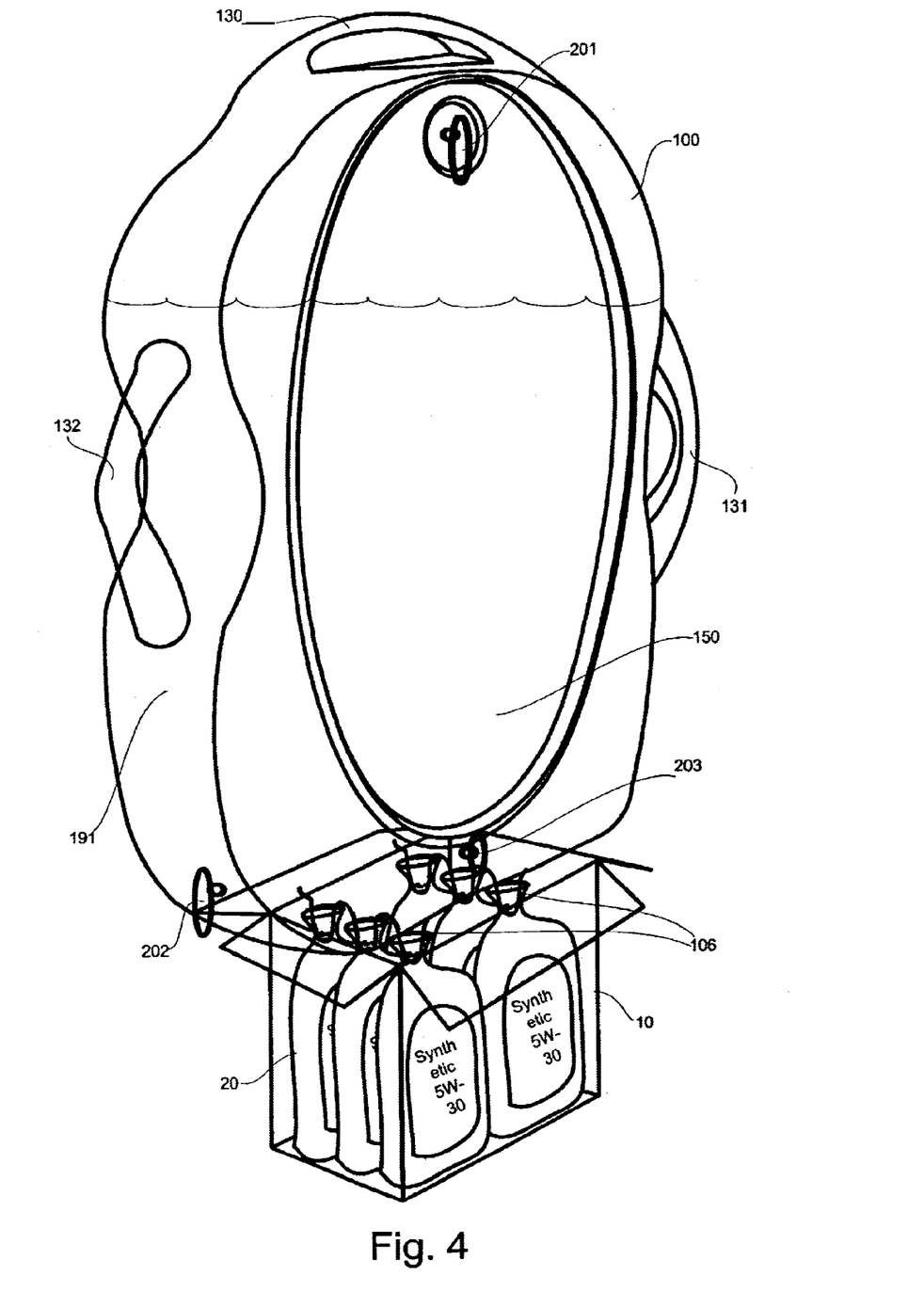
FIG. 4 renders side-front view of fluids disposal symbiotic apparatus put on top of cardboard box with empty oil bottles ready to accept waste fluid collected by said apparatus.

As shown on FIG. 4, operator stands apparatus 100 upright on top of box 10 the latter equipped with plurality, usually six, empty oil cans 20, for dispensing waste oil, or other fluids recessed earlier in the waste collection session in the container stomach 191. Additionally, in case filled apparatus is heavy enough to possibly damage cardboard box 10, then optional supportive stand may be introduced as shown on the subsequent figures, but not on FIG. 4, because normally the strength of the cardboard box filled with plurality of empty cans is sufficient to hold most of the weight of filled apparatus with the rest of its weight supported by the operator with help of handlers 130, 131, 132. Once technician makes sure valve 201, 203 are closed and opens valve 202 the bulk of waste fluid may freely flow from stomach 191 through plurality of hoses 106, however valve 201, 203 should remain closed at this time. Number of hoses 106 symbiotically equals number of empty oil cans in the original box, often six. Nozzles or hoses 106 penetrate into empty oil can necks in one to one relationship. Once the bulk of waste fluid from stomach 191 has been drained via valve 202, technician may close valve 202 and open valve 203, the latter allows the remainders of waste fluid collected on the bottom corner of the outer funnel 150 be released into the oil collecting containers 20 through valve 203, next distributed through plurality of channels inside hoses 106. Therefore valves 202, 203 allow for full drainage of the waste fluid from inside stomach 191 and outside funnel 150 of the apparatus 100. Normally, amount of waste fluid in the vehicle engine drained into apparatus is less than the capacity of empty oil cans, because oil is evaporating during the engine work time between oil changes, therefore operator or technician may or may not worry about overfill of said cans 20, therefore she or he just keeps the apparatus 100 in the upright position until waste fluid fills plurality of empty oil cans 20 through plurality of hoses 106 through valves 202, 203 and hoses 106. Once oil containers 20 are filled, operator closes valves 202, 203, then may place said apparatus 100 into designated place for cleaning and storage purposes. Finally operator may close cups of containers 20 in box 10, then she or he seals box 10, and the latter is conveniently ready for remainder of disposal procedure established with this particular oil change shop or according to appropriate state regulations. As one experienced in Art may conclude there are no waste spills or mess occurring and all work may be done by a single person.

As was mentioned before technician may close second valve 202 and opens third valve 203 letting the remainders of waste oil leftovers accumulated in the outer funnel 150 and collected in the lower, as on FIG. 4, corner of the funnel 150 while the main container stomach 191 has been emptied, said outer remainders drain into oil cans via leftover valve 203 release channels of said plurality of hoses 106.

Finally, technician closes the third valve 203 and puts apparatus 100 down on its wheels. At this point operator may wipe with napkin or otherwise clean up the surface of the funnel 150 and put apparatus 100 into storage place. Then she or he closes cups of the plurality of oil cans 20, and may dispose used napkins and whatever leftovers of used stuff left around into the box 10, then she or he closes and seals the box 10, and forwards said box 10 into designated waste recycling facility.

As it may be observed at this point oil change process has been completed quickly and conveniently avoiding spills, mess of waste or fresh oil into the environment, moreover original oil cardboard box 10 and all oil cans 20 have been fully reused, and no additional means to store waste oil on its way to recycle facility are needed.

Figure 5:
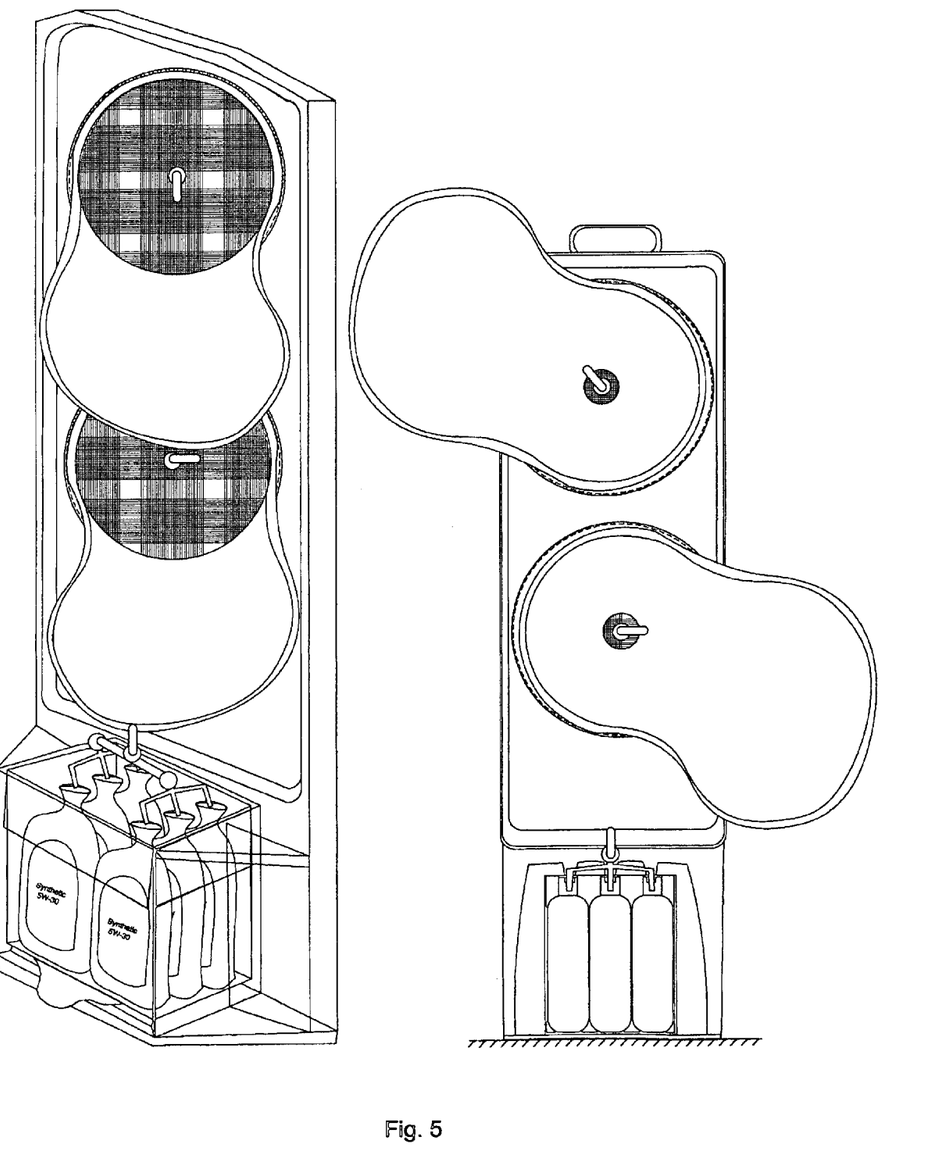
FIG. 5 shows front view of variation of fluids disposal symbiotic apparatus with helper stand and plurality of turning funnels allowing to enhance the waste collection area and adjust said apparatus to the configuration of different vehicles, note that not shown is additional extra accessory e.g. multi-hose to single-hose adapter or other convenient funnel-adapter.
Figure 6:
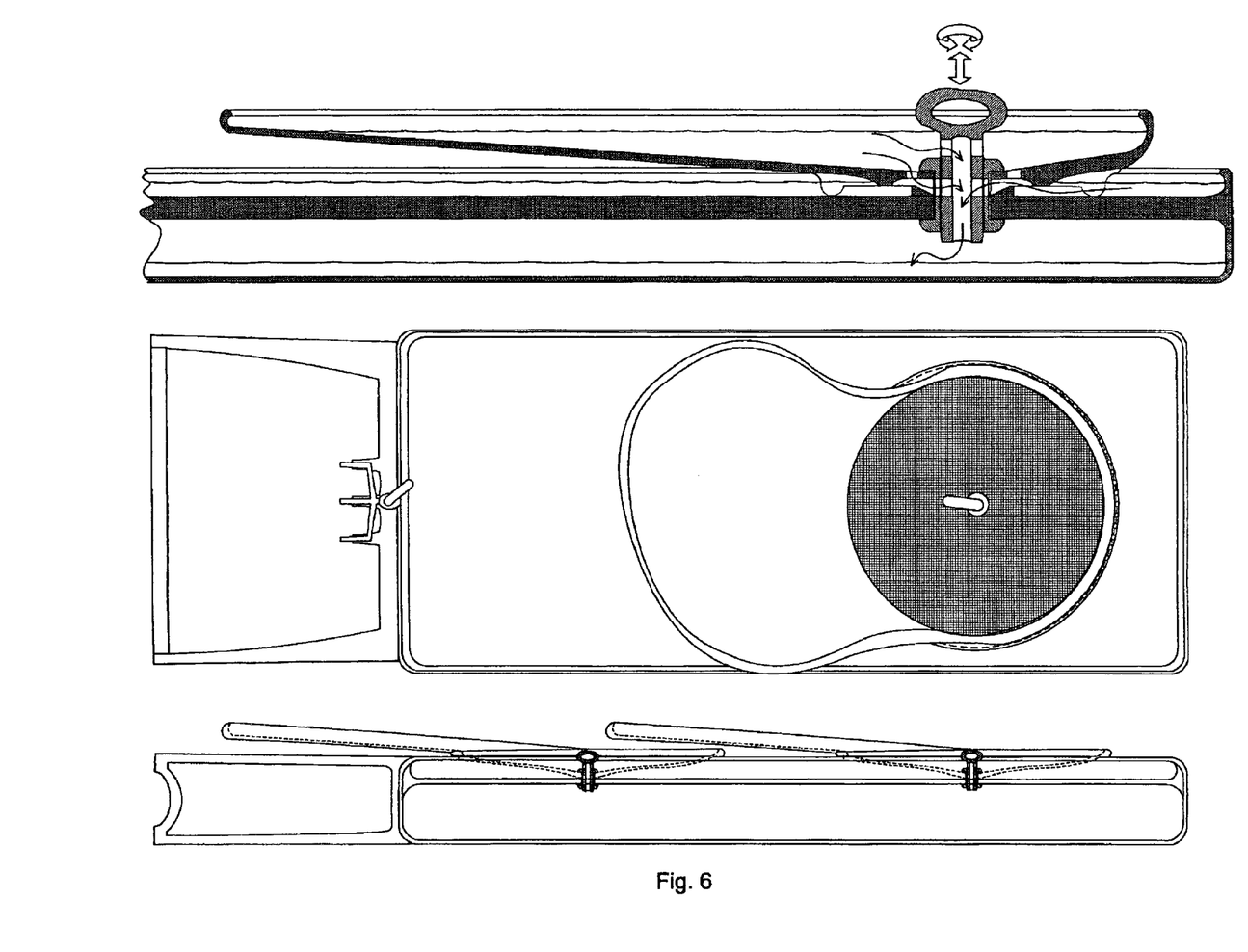
FIG. 6 renders top and side general views of variation of fluids disposal symbiotic apparatus with helper stand and plurality of turning funnels allowing enhancing the waste collection area and adjusting said apparatus to the configuration of different vehicles.

FIG. 5 and FIG. 6 therein illustrate some variations of said fluids disposal symbiotic apparatus such that those experienced in Art may recognize additional new and improved versions of said apparatus, helper stand and/or other accompanying accessories e.g. multi-hose to single hose adapter or funnel to help dispose multiple streams into single stream or other number of streams and make usage of said apparatus more convenient and safe.

Moreover it is understood that aforementioned description of this invention and attached drawings are illustrating just few main ideas behind current invention which may cover wide area of forms, variations and applications of said apparatus and any number and shape of accessories associated with said apparatus and method e.g. said multi-hose to single hose adapter and/or other helper components not necessarily shown on figures therein or current invention description specification.

I claim:

1. A liquid disburser device for filling a plurality of bottles in a carton comprising:

a flat body having geometrical dimensions allowing easy insertion of said flat body in a horizontal position underneath a vehicle leaving enough space for a technician and equally a hobbyist car enthusiast to access the bottom of said vehicle without lifting said vehicle;

said flat body permitting said technician to perform waste fluids collecting, storing and distribution operations without using a pit;

said flat body receiving waste fluids from said vehicle drain sources during collecting and storing operation, said flat body horizontally pullable out from underneath said vehicle, said flat body further turnable in a vertical position to stackable on top of said carton for simultaneously and equally filling by gravity a plurality of generally plastic bottles packed in said carton during waste fluids distribution operation;

at least one upper container having a wide open top for receiving liquid from said drain sources;

at least one lower container for storing liquid, said lower container having at least one inclination and at least one hole in the side wall of said lower container, said hole located at the bottom of said inclination;

a separation wall alienating said upper container from said lower container, said separation wall having at least one slope and at least one hole located at the bottom of said slope;

said upper container, said lower container and said separation wall collectively establishing a structural basis of said flat body further extending handling means to help said technician handle, move underneath and around said vehicle and turn said flat body from a horizontal to vertical position during said collecting, storing and distribution operations;

at least one valve means incorporated with each of said holes, said valve means being responsive to permit or prevent the flow of liquid;

a first said valve means having an intake connected to said hole in said separation wall, said first valve means controlling the flow of liquid from said upper container to said lower container during said collect and store operation, said first valve means allowing air from atmosphere to enter said lower container during said distribution operation;

said second valve means having an intake connected to said hole in said side wall of said lower container, said second valve means allowing air to escape from said lower container during said collect and store operation, said second valve means controlling the flow of stored liquid from said lower container out and downward during said distribution operation;

at least one liquid distributor having an intake connected to said second valve means;

a plurality of individually shaped, sized and configured tubular distribution members pluggable in said liquid distributor to form a multi-point exhaust member fitting a pattern of open necks of said bottles in said carton for equal and simultaneous discharge of waste fluids into said bottles and letting an air out of said bottles during said distribution operation.

2. The liquid disburser device according to claim 1 including:

at least one protection screen from said upper container's side wall closest to said second valve means into a pocket having shape and capacity sufficient to accept and keep waste liquid leftovers remaining in said upper container after completion of said collecting and storing operation, said pocket preventing spill of said leftovers into a surrounding environment during said distribution operation, said pocket having at least one outlet;

an extended valve means in place of said second valve means, said extended valve means having an extra intake connected to said outlet, said extended valve means being responsive to permit or prevent the flow of said leftovers from said pocket and the flow of the bulk of waste fluid from said lower container interchangeably mutually exclusively, said extended valve means directing its outflow into said liquid distributor during said distribution operation.

3. The liquid disburser device according to claim 2 including:

a holder incorporated with said flat body on the outflow side of said liquid distributor, said holder able to reliably accommodate said carton;

said holder being transformable into at least two stable distinct configurations including at least an engaged position and a disengaged position;

said holder is in said engaged position allowing at least one of said holder geometric dimensions to exceed at least one of said flat body boundaries, for said holder to conveniently accept and reliably host said carton by gripping and holding said carton preloaded with said bottles;

said holder in said disengaged position having geometric dimensions fitting within the boundaries of said flat body, preserving said flat body freedom to be moved as desired by said technician accessing said drain outlets underneath said vehicle during said collecting and storing operation, as well as allowing easy removal of said carton from said holder on completion of said distribution operation;

a latch trigger incorporated with said holder, said latch trigger being responsive to position said holder into at least one of said stable configurations ensuing in reliable stay of said carton in said holder in said engaged position resulting in a leak-proof precise accommodation of said open necks of said bottles by said multi-point exhaust member to guarantee environmentally safe delivery of waste fluids from said flat body into said bottles during said distribution operation.

4. The liquid disburser device according to claim 3 including:

at least one hollow generally tubular axle having at least one perforation;

at least one rotating wing having at least one hole and at least one friction member close to said hole, said rotating wing shaped as an eccentric stretched elevated funnel wide open to receive liquid on top surface of said rotating wing inclined towards said hole, said rotating wing having at least one perforation in close proximity to said hole;

at least one joint comprised of said rotating wing, said separation wall, and said tubular axle pried through said hole in said separation wall and said hole in said rotating wing, said tubular axle fixed to intimately secure said rotating wing on the upper surface of said separation wall;

said joint generally located in close proximity to said flat body edge letting said rotating wing to turn said tubular axle extending far beyond the limiting perimeter of said flat body and allowing to collect waste liquid from said drain outlets located in lateral directions outward the coverage of said wide open top of said upper container;

said friction member collaborating with said separation wall to keep said rotating wing in an optimum definite position desired by said technician and to maximize the receiving coverage of said liquid disburser device.

5. A method for simultaneously equally filling a plurality of bottles in a carton comprised of steps:

putting said liquid disburser device horizontally underneath said vehicle without lifting said vehicle and not using a pit;

adjusting as desired all receiving openings of said device against one or more drain outlets including said vehicle's oil filter seating;

ensuring said valve means incorporated with said liquid disburser device are in their respective positions allowing to accept and store of waste fluids by said device and let air escape from said device, performing and completing waste fluid collecting and storing operation;

performing oil change operation according to said vehicle's maintenance manual, said oil change operation commonly involving emptying into said vehicle's engine the contents of said bottles normally purchased full of fresh oil and generally packed in a count of six inside said carton;

making sure said valve means of said liquid disburser device are in positions preventing leaking into surrounding environment of collected and stored waste liquid;

pulling out said liquid disburser device from underneath said vehicle;

checking said bottles are empty and all stand in said carton with their necks open and positioned up in a pattern matching the pattern of a multi-point exhaust member of said liquid distributor;

engaging said holder into position allowing to accept a carton, inserting said carton with said bottles into said holder, and engaging a latch trigger of said holder to let open necks of said bottles fit said multi-point exhaust member, ensuring said carton is firmly gripped inside said holder;

installing said liquid disburser device in upright vertical position and ensuring said valve means are in positions allowing waste fluids fill up said bottles in said carton;

completing said distribution operation, closing said valve means, disengaging said latch trigger to dismiss said open necks of filled bottle aside from said multi-point exhaust member, closing said bottles necks with their original caps, disengage said holder to release said carton from said grip;

pulling said carton out of said holder, closing and sealing said carton top for compact and environmentally safe storage in said bottles original carton and delivery of sealed carton to a waste liquid recycling facility.

* * * * *